US012179222B2

(12) United States Patent
Pahl

(10) Patent No.: US 12,179,222 B2
(45) Date of Patent: Dec. 31, 2024

(54) NOZZLE ARRANGEMENT FOR APPLYING FLUIDS, USE OF THE NOZZLE ARRANGEMENT, AND SYSTEM FOR APPLYING FLUIDS

(71) Applicant: Illinois Tool Works Inc., Glenview, IL (US)

(72) Inventor: Andreas Pahl, Erkrath (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 378 days.

(21) Appl. No.: 17/228,457

(22) Filed: Apr. 12, 2021

(65) Prior Publication Data

US 2021/0316320 A1 Oct. 14, 2021

(30) Foreign Application Priority Data

Apr. 14, 2020 (DE) ..................... 10 2020 110 184.8

(51) Int. Cl.
*B05B 1/06* (2006.01)
*B05B 15/70* (2018.01)
*B05D 1/02* (2006.01)

(52) U.S. Cl.
CPC ................ *B05B 1/06* (2013.01); *B05B 15/70* (2018.02); *B05D 1/02* (2013.01)

(58) Field of Classification Search
None
See application file for complete search history.

(56) References Cited

U.S. PATENT DOCUMENTS 4,335,677 A 6/1982 Nagata et al.
5,065,943 A 11/1991 Boger et al.
5,375,766 A 12/1994 Sweeney
6,082,637 A 7/2000 Ludwig
2005/0023376 A1 2/2005 Anderson
(Continued)

FOREIGN PATENT DOCUMENTS

CN 110369169 A 10/2019
DE 2356229 A1 5/1975
(Continued)

OTHER PUBLICATIONS

English translation of DE29519681.*
(Continued)

*Primary Examiner* — Charles Capozzi
(74) *Attorney, Agent, or Firm* — Christopher R. Carroll; The Small Patent Law Group LLC

(57) ABSTRACT

A nozzle arrangement for applying fluids to a substrate has a connection body that is connectable to a distributor mounting region and has a spray nozzle that is connectable to the connection body. The spray nozzle has a nozzle body that longitudinally extends and has a first fluid channel for the fluid to be applied to the substrate. The spray nozzle has a nozzle housing in which the nozzle body is received. Second fluid channels for shaping air are formed between a lateral surface and inner of the nozzle body. The second fluid channels extend in the direction of a nozzle outlet opening of the nozzle body such that, by way of the shaping air dispensed from the second fluid channels at the nozzle outlet region, a spiral-shaped deflection of the fluid dispensed from the nozzle outlet opening of the nozzle body is created.

19 Claims, 6 Drawing Sheets

(56) References Cited

U.S. PATENT DOCUMENTS

| | | | | |
|---|---|---|---|---|
| 2005/0095365 | A1 | 5/2005 | Acum et al. | |
| 2006/0138252 | A1* | 6/2006 | Keudell | B05B 7/1472 239/311 |
| 2007/0102539 | A1 | 5/2007 | Riney | |
| 2010/0038448 | A1* | 2/2010 | Ghavami-Nasr | B08B 3/026 239/525 |
| 2010/0260531 | A1* | 10/2010 | Rademacher | B05C 11/1047 401/146 |
| 2016/0228896 | A1 | 8/2016 | Jones | |
| 2016/0288145 | A1 | 10/2016 | Zumberger et al. | |

FOREIGN PATENT DOCUMENTS

| | | | |
|---|---|---|---|
| DE | 29519681 | U1 | 2/1996 |
| DE | 69033812 | T2 | 6/2002 |
| DE | 20303571 | U1 | 4/2003 |
| DE | 102005056006 | A1 | 7/2006 |
| DE | 102017200890 | A1 | 7/2018 |
| EP | 0872580 | A1 | 10/1998 |
| EP | 3165288 | A1 | 5/2017 |
| WO | 199401222 | A1 | 1/1994 |

OTHER PUBLICATIONS

Examination Report mailed Oct. 22, 2020 for corresponding DE Application No. 10 2020 110 184.8 (9 pages).
Decision to grant a European patent dated Nov. 7, 2023 for corresponding EP 21 167 158.1 (5 pages).

* cited by examiner

NOZZLE ARRANGEMENT FOR APPLYING FLUIDS, USE OF THE NOZZLE ARRANGEMENT, AND SYSTEM FOR APPLYING FLUIDS

CROSS-REFERENCE TO RELATED APPLICATIONS

This application claims priority to German patent application 10 2020 110 184.8, which was filed on 14 Apr. 2020, and the entire disclosure of which is incorporated herein by reference.

BACKGROUND

Technical Field

The invention relates generally to the application of fluids, including thermoplastic or fibrous adhesives, to a substrate by means of at least one nozzle arrangement which is preferably detachably fastened to a mounting surface of a distributor or a distributor head, where the distributor or distributor head typically serves to deliver the fluid to be applied to the at least one nozzle arrangement.

The purpose of such a system is to apply fluids to substrates moving relative to the at least one nozzle arrangement, for example, and in particular to apply adhesives in partial spray patterns to partially cover a substrate.

Discussion of Art

Document EP 0 872 580 A, for example, discloses a plurality of melt blowing nozzle arrangements or nozzles that can be fastened side by side at one or both ends of a conventional distributor or distributor head, which ensures a metered delivery of adhesive to each nozzle arrangement. Each nozzle arrangement comprises a plurality of substantially parallel plate elements, which form a row of adhesive-dispensing openings on an outlet surface. The row of fluid discharge openings of each nozzle arrangement forms a portion of a longer row formed by the plurality of adjacent nozzle arrangements disposed along a common end of the distributor head. One or both sides of the distributor can be fastened alongside a similarly constructed distributor head to form even longer rows of fluid discharge openings, thereby providing a modular melt blowing adhesive dispenser system that accommodates substrates of any dimensional width.

In some adhesive-dispensing applications, the adhesive is applied in such a way that the adhesive covers the entire width of the substrate, and in other applications it is desirable for the adhesive to be applied only to selected portions or regions of the substrate and to keep other portions or regions of the substrate free of adhesive. This is the case, for example, for applications in which an edge fold region of a substrate has to be provided with adhesive.

Edge folding is the process of folding a material 90 degrees or 180 degrees around a part edge. The thus formed edge fold region is then often fastened to a carrier part by means of a suitable joining method, in particular adhesive bonding.

Such edge folding processes are used in particular in the automotive industry for trim parts. The increasingly complicated three-dimensional geometries of the trim parts present a major challenge to the joining methods to be used. One problem in particular is applying an appropriate adhesive pattern uniformly and continuously in the edge fold regions with the aid of a nozzle arrangement guided by a robot arm.

In a schematic and isometric view, FIG. 1 shows a conventional system 50 for applying thermoplastic adhesives 20 to a substrate 21 comprising corresponding edge fold regions.

The system 50 according to FIG. 1 consists substantially of a distributor head 30, which preferably is or can be connected to a robot arm (not shown in FIG. 1) and which can be moved along a movement direction relative to the substrate 21. In a mounting region of the distributor head 30, a nozzle arrangement 101 is preferably interchangeably connected to the distributor head 30. The distributor head 30 serves to appropriately supply the nozzle arrangement 101 with the thermoplastic adhesive 20 to be sprayed and, optionally, with shaping air, etc.

The nozzle arrangement 101 used in the conventional system 50 to apply thermoplastic adhesives 20 to a substrate 21 comprises a base body 102, which, seen in plan view, is at least substantially rectangular and which is connected to the mounting region of the distributor head 30.

The base body of the nozzle arrangement 101 comprises a front-side lateral surface, via which thermoplastic adhesive 20 to be applied to the substrate 21 is dispensed with the outlet surface.

For this purpose, as indicated in FIG. 1, a discharge nozzle 105 is formed on the front-side lateral surface of the base body 102 of the nozzle arrangement 101, where the discharge opening of the discharge nozzle 105 is configured such that a main flow axis, which is defined by the discharge opening and along which the adhesive jet 20 dispensed by the discharge nozzle moves, encloses a right angle (90 degrees) with the front-side lateral surface of the base body 102.

The fundamental problem with this design of the nozzle arrangement 101 is that, when the distributor head 30 moves relative to the substrate 21 in the movement direction indicated in FIG. 1 by the arrow, due to the complex three-dimensional geometry of the substrate 21, there is a risk that either the distributor head 30 comes into contact with the substrate 21, or specific regions of the substrate 21, in particular regions in an edge fold region of the substrate 21, can no longer be reached by the nozzle arrangement 101.

BRIEF DESCRIPTION

Based on this problem, the underlying object of the invention is therefore to specify a nozzle arrangement for applying fluids, in particular thermoplastic adhesives, to a substrate, where the nozzle arrangement makes it possible to apply the thermoplastic adhesive or the fluid in a targeted manner, even in the case of complicated geometries of the substrate.

A correspondingly optimized system for applying fluids, in particular thermoplastic adhesives, to substrates having a correspondingly complex geometry is to be specified as well.

With regard to the nozzle arrangement, the underlying object of the invention is solved by the subject matter of independent claim 1, where advantageous further developments of the nozzle arrangement according to the invention are specified in the dependent claims 2 to 13.

With regard to the system, the underlying object of the invention is solved by the subject matter of the ancillary claim 15.

The ancillary claim 14 relates to the use of the nozzle arrangement according to the invention for applying a fluid, in particular a thermoplastic adhesive, to an edge fold region of a component.

The present invention therefore relates in particular to a nozzle arrangement for applying fluids, in particular thermoplastic adhesives, to a substrate, where the nozzle arrangement comprises a spray nozzle which can preferably be used interchangeably with a mounting region of a distributor.

In order to ensure that the nozzle arrangement can be used to apply the thermoplastic adhesive or the fluid in a targeted manner even in the case of complicated geometries of the substrate, according to the invention it is in particular provided that the spray nozzle of the nozzle arrangement be configured as a relatively long finger spray nozzle having a relatively small diameter, to thus make it possible for the fluid (in particular the thermoplastic adhesive) to be applied in a targeted manner with the spray nozzle, even to regions of the substrate that are otherwise difficult to access.

In this context, a two-part structure of the spray nozzle is in particular provided for the design of the finger spray nozzle, where the spray nozzle comprises an in particular rod-shaped nozzle body which extends in the longitudinal direction of the spray nozzle as the first component and a nozzle housing as the second component, in which the nozzle body is or can be accommodated at least partly.

At least one first fluid channel, and preferably exactly one (single) first fluid channel, for the fluid to be applied to the substrate is formed in the in particular rod-shaped nozzle body. This preferably single first fluid channel extends in particular coaxially to the longitudinal axis of the in particular rod-shaped nozzle body.

The spray nozzle of the nozzle arrangement according to the invention is particularly preferably configured to dispense the fluid, and in particular the thermoplastic adhesive, at the end-side nozzle outlet region of the spray nozzle in a spiral shape. In this context it is in particular desirable for the fluid to be dispensed at the end-side nozzle outlet region of the spray nozzle in as perfectly round a spiral as possible. The spiral-shaped dispensing of the fluid at the end-side nozzle outlet region of the spray nozzle has the crucial advantage that the nozzle arrangement does not always have to be aligned exactly in relation to the surface of the substrate when applying the fluid. When applying fluids in an edge fold region in particular, this is typically not possible, or possible only with a great deal of effort, because the shape of the substrate in edge fold regions is generally very complex and, when aligning the nozzle arrangement relative to the substrate, the nozzle arrangement has to continuously be realigned to take into account the complex shape of the edge fold region.

To create a spiral shape of the fluid dispensed from the first fluid channel at the nozzle outlet region of the spray nozzle, the solution according to the invention makes use of suitable shaping air.

In this context, it is in particular provided that a plurality of second fluid channels for shaping air are formed at least in certain areas between an outer surface of the nozzle body and an inner surface of the nozzle housing of the spray nozzle. At the end-side nozzle outlet region of the spray nozzle, the second fluid channels for the shaping air extend in the direction of a nozzle outlet opening of the nozzle body such that a spiral-shaped deflection of the fluid dispensed or to be dispensed from the nozzle outlet opening of the nozzle body can be caused or is created with the shaping air discharged from the second fluid channels at the nozzle outlet region.

According to preferred implementations of the nozzle arrangement according to the invention, it is provided that the nozzle housing is configured at least in certain areas as a sleeve-shaped body which at least partly surrounds the nozzle body.

The best option here is for the nozzle housing to be fastened or fastenable to a connecting region of a connecting body of the nozzle arrangement, preferably together with the nozzle body and in particular in a detachable and/or interchangeable manner.

According to preferred embodiments of the nozzle arrangement according to the invention, a squeeze screw connection at the connecting region of the connecting body created via a union nut is used to fasten the nozzle housing with the nozzle body to the connecting region of the connecting body.

This embodiment has the crucial advantage that both the nozzle housing and the nozzle body can be removed from the connecting region of the connecting body by loosening the union nut. Loosening the union nut also loosens the connection between the nozzle housing and the nozzle body, so that the two components can be cleaned and/or serviced separately or the two components can be replaced independently of one another.

Different configurations for forming the in particular rod-shaped nozzle body are possible.

According to preferred implementations of the nozzle arrangement according to the invention, it is in particular provided that the preferably exactly one first fluid channel, which extends in particular coaxially to the longitudinal axis of the nozzle body, is configured as a through-bore in the rod-shaped nozzle body.

The best option for forming the second fluid channels is for the in particular rod-shaped nozzle body to have a polygonal cross-sectional profile at least in certain areas. When the rod-shaped nozzle body with the polygonal cross-sectional profile is accommodated in the nozzle housing, the individual second fluid channels are formed in the region of the surfaces of the polygonal cross-sectional profile.

According to preferred implementations of the rod-shaped nozzle body, the nozzle body in particular has a hexagonal cross-sectional profile with a diameter of 6 mm to 10 mm and a key face dimension of the hexagon between 5 mm and 9 mm.

As a result of the hexagonal cross-sectional profile, a total of six second fluid channels are formed in such a rod-shaped nozzle body when the rod-shaped nozzle body is accommodated in the nozzle housing.

It is generally advantageous for the diameter of the rod-shaped nozzle body to be in a range from 6 millimeters (mm) to 12 mm and preferably in a range from 6 mm to 10 mm. These dimensions make it possible to create a particularly "slim" finger spray nozzle.

As an alternative to the last-mentioned embodiment, it is conceivable for the in particular rod-shaped nozzle body to at least in certain areas have an at least substantially circular-cylindrical cross-sectional profile, where groove regions extending parallel to the longitudinal axis of the nozzle body are formed in the outer surface of the circular-cylindrical nozzle body to form the second fluid channels.

In order to achieve as perfect a spiral shape as possible of the fluid dispensed at the end-side nozzle outlet region of the spray nozzle via the first fluid channel, the second fluid channels should be configured evenly spaced, and in particular equidistant with respect to one another, over the outer surface of the nozzle body.

According to implementations of the nozzle arrangement according to the invention, it is provided that, at least in the region in which it is held in the nozzle housing, the nozzle body is configured at least partly as a substantially cylindrical nozzle body, where groove regions extending in the longitudinal direction of the spray nozzle and/or regions extending in the longitudinal direction of the spray nozzle and recessed with respect to the outer surface of the cylindrical body, are formed in the substantially cylindrical nozzle body, which, together with the inner surface of the nozzle housing, delimit the second fluid channels at least partly.

Of course, other embodiments for the nozzle body are possible here as well.

According to a further aspect of the present invention, it is provided that at least the inner surface of the nozzle housing on the end-side nozzle outlet region of the spray nozzle has a conical shape which tapers in the direction of the nozzle outlet opening of the nozzle body and in particular matches a conical shape of the nozzle body, namely such that, at least on the nozzle outlet region of the spray nozzle, the second fluid channels are aligned decentered in the direction of the nozzle outlet opening of the nozzle body and in particular with respect to the nozzle outlet opening of the nozzle body.

This aspect is a particularly easy-to-implement but nevertheless effective measure to achieve as perfect a spiral shape as possible of the fluid dispensed from the first fluid channel at the nozzle outlet opening of the nozzle body.

In this context, it is advantageous that groove and/or recess regions are formed in the nozzle body on the end-side nozzle outlet region of the spray nozzle, each of which is fluidically connected to one of the second fluid channels. The shaping air transported by the second fluid channels can thus be delivered in a targeted manner to the end-side nozzle outlet region of the spray nozzle.

At the end-side nozzle outlet region of the spray nozzle, the nozzle body preferably has a conical shape which tapers in the direction of the nozzle outlet opening of the nozzle body with a cone angle of preferably 30 degrees to 120 degrees and in particular with a cone angle of preferably 50 degrees to 100 degrees.

By varying the cone angle, the radius of the spiral shape of the fluid dispensed from the first fluid channel at the nozzle outlet opening of the nozzle body can be varied. Reducing the cone angle therefore reduces the diameter/radius of the spiral shape.

According to preferred implementations of the spray nozzle according to the invention, seen in the longitudinal direction of the spray nozzle, the nozzle body has a length of 20 mm to 100 mm and preferably a length of 30 mm to 80 mm, and even more preferably a length of 40 mm to 60 mm.

Alternatively or additionally, it is advantageous if the nozzle body with the nozzle housing has a maximum average diameter of 20 mm and preferably a maximum average diameter of 15 mm. It is thus possible to create particularly slim finger spray nozzles with the solution according to the invention.

According to a further aspect of the present invention, it is provided that, when the spray nozzle is mounted on the connecting region of the connecting body, a preferably ring-shaped region is formed in a region between the connecting body and the spray nozzle and, on the one hand, is fluidically connected to a source for shaping air, in particular with a compressed air, and, on the other hand, is fluidically connected to the second fluid channels of the spray nozzle.

Providing such a preferably ring-shaped region at the connecting region of the connecting body ensures that a preferably equal and constant quantity of shaping air is fed into each second fluid channel per unit of time.

According to a further development of the aforementioned aspect, it is in particular provided that a seal, in particular in the form of a sealing ring, is associated with the nozzle body in order to separate the in particular ring-shaped region for shaping air and a region, which is preferably arranged axially with respect to the longitudinal axis of the nozzle body and via which the fluid to be applied to the substrate can be fed into the first fluid channel of the spray nozzle.

The invention further relates to the use of the aforementioned nozzle arrangement according to the invention to apply a fluid, in particular thermoplastic adhesive, to an edge fold region of a component.

The invention also relates to a system for applying fluids, in particular thermoplastic adhesives, to a substrate, where the system comprises a distributor head, which can be moved along a movement direction relative to the substrate. The distributor head preferably is or can be connected to a robot arm.

The system furthermore comprises at least one nozzle arrangement of the type according to the invention described above, which is preferably interchangeably connected to the distributor head in a mounting region of the distributor head.

The nozzle arrangement according to the invention in particular makes it possible for even complex geometric regions of the substrate, in particular, to effectively reach the region of the nozzle outlet opening of the spray nozzle when the fluid is applied to the substrate, without the occurrence of contact between the nozzle arrangement or the distributor or distributor head and the substrate.

The invention further relates to a method for applying fluids, in particular thermoplastic adhesives, to a substrate, for which purpose a nozzle arrangement is moved relative to the substrate in a movement direction, where the nozzle arrangement is in particular a nozzle arrangement of the type according to the invention described above.

In the application method according to the invention, a fluid jet is furthermore dispensed through the nozzle outlet opening of the nozzle body of the nozzle arrangement, namely in particular during the movement of the nozzle arrangement relative to the substrate.

In this regard, it is in particular provided that the fluid jet dispensed through the nozzle outlet opening of the nozzle body is preferably deflected with the aid of shaping air, in particular to create a spiral-shaped pattern of the fluid jet to be applied to the substrate.

The substrate is advantageously a component with an edge fold region, where the nozzle arrangement is moved at least partly into the edgefold region of the substrate as the fluid jet is being dispensed through the nozzle outlet opening of the nozzle body.

BRIEF DESCRIPTION OF THE DRAWINGS

Example embodiments of the present invention are described in more detail in the following with reference to the accompanying drawings.

The figures show.

DETAILED DESCRIPTION

It has long been recognized that thermoplastic adhesives constitute good binding agents. This is because the adhesives harden quickly, which is particularly advantageous when the adhesive is applied incrementally and the joining of the parts to be bonded is then immediate, and the obtained adhesive bond is very strong. The range of components of which thermoplastic adhesives can be composed is moreover so extensive that an appropriate adhesive composition can easily be produced for any given purpose.

Nevertheless, certain difficulties have stood in the way of the widespread use of these adhesives insofar as the thermoplastic adhesive sometimes cannot be applied in an automated manner to specific, selected regions of a substrate, in particular those having a complex geometry, or can only be applied with great difficulty. This applies in particular to edge fold regions of substrates formed as molded bodies.

Figure 1:
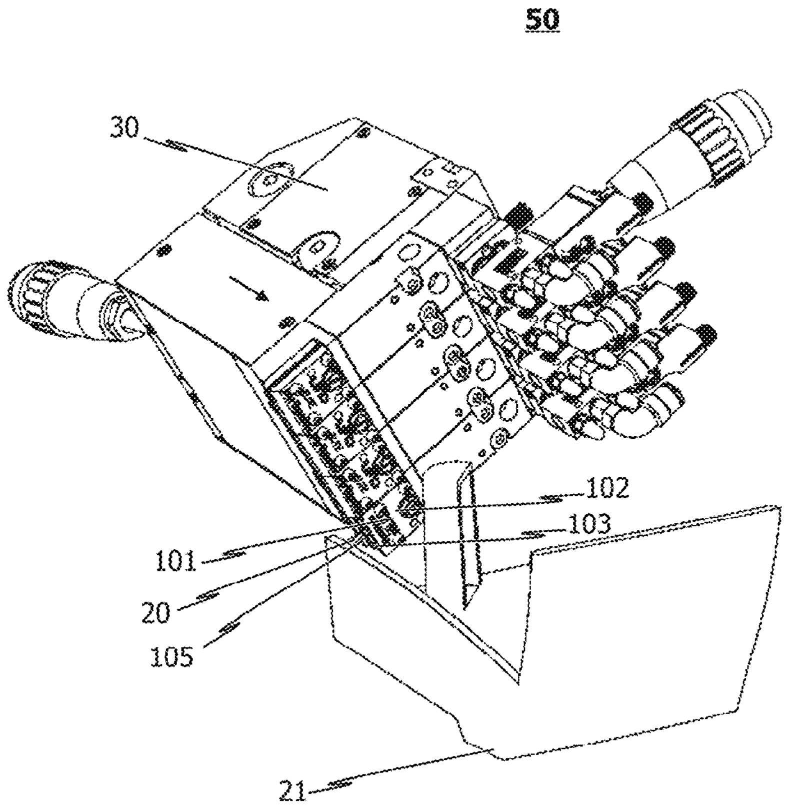
FIG. 1 schematically and in an isometric view, a conventional system for applying thermoplastic adhesives to a substrate.

FIG. 1 shows schematically and in an isometric view a conventional system 50, by means of which a thermoplastic adhesive 20 is applied in an automated manner to specific regions of a substrate formed as a molded part. The conventional system 50 for applying thermoplastic adhesives 20 to a substrate 21 formed as a molded body comprises a distributor head 30, which preferably is or can be connected to a robot arm not shown in FIG. 1 and which can be moved along a movement direction relative to the substrate 21 with the aid of the robot arm.

As shown in FIG. 1, the conventional system 50 for applying thermoplastic adhesives further comprises a nozzle arrangement 101, which is preferably interchangeably connected to the distributor head 30 in a mounting region of the distributor head 30. The nozzle arrangement 101 is formed substantially by an approximately rectangular base body 102, via which the nozzle arrangement 101 is connected to the mounting region of the distributor head 30. This base body 102 of the nozzle arrangement 101, which is substantially rectangular when viewed from above, comprises a front-side lateral surface 103 in which a discharge nozzle 105 is formed. The main flow axis defined by the discharge nozzle 105 or the discharge opening of the discharge nozzle 105, along which the thermoplastic adhesive material 20 dispensed by the discharge nozzle 105 moves, encloses an at least substantially right angle with the front-side lateral surface 103 of the base body 102 of the nozzle arrangement 101. The front-side lateral surface 103 of the base body 102 is furthermore in the movement direction of the distributor.

In applications of the conventional system 50 for molded parts having complex geometric structures and in particular comprising edge fold regions, it is typically unavoidable that either parts of the system, in particular the distributor head or the nozzle arrangement, come into contact with regions of the molded part or that not all necessary regions of the molded part can be reached with the nozzle arrangement.

To solve this problem, the invention proposes an optimized nozzle arrangement 1, where example embodiments of the nozzle arrangement 1 are described in more detail in the following with reference to the illustrations in FIG. 2 to FIG. 12.

Figure 2:
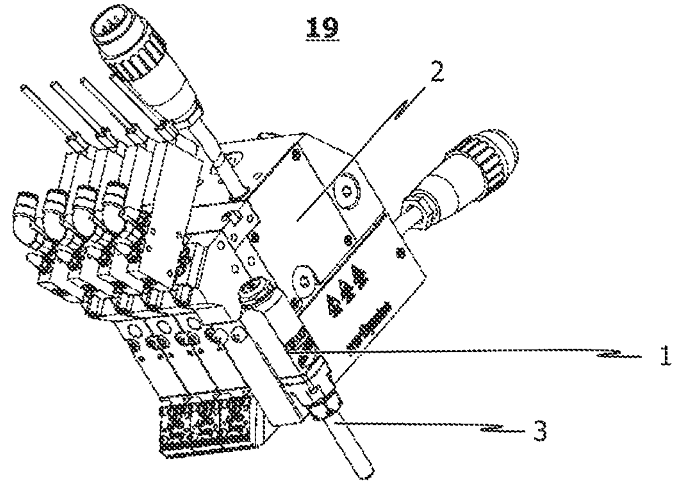
FIG. 2 schematically and in an isometric view, an example embodiment of a system according to the invention for applying thermoplastic adhesives to a substrate.

More specifically, in a schematic and isometric view, FIG. 2 shows an example embodiment of the system 19 according to the invention, where the system 19 is used to apply fluids 20, in particular thermoplastic adhesives, to a substrate 21, and where the system 19 substantially comprises a distributor head 2, which preferably is or can be connected to a robot arm and which can be moved along a movement direction relative to the substrate 21 (not shown in FIG. 2).

The system 19 schematically shown in FIG. 2 furthermore comprises a nozzle arrangement 1, which is preferably interchangeably connected to the distributor head 2 in a mounting region of the distributor head 2.

The structure and the mode of operation of the nozzle arrangement 1 used in the system 19 shown schematically in FIG. 2 are described in more detail in the following with reference to the illustrations in FIG. 4 to FIG. 11.

Figure 3:
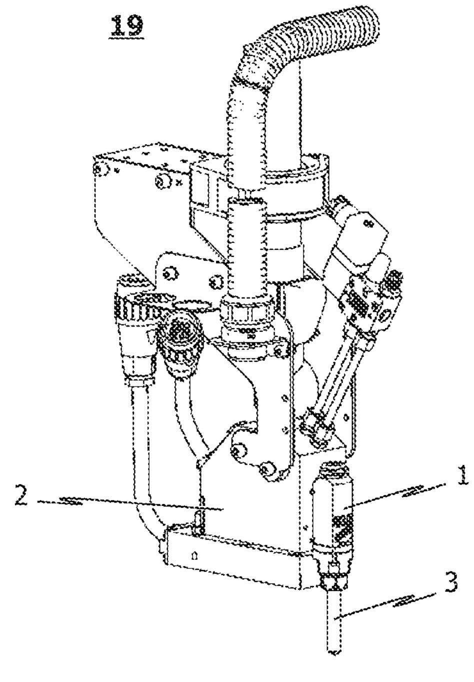
FIG. 3 schematically and in an isometric view, a further example embodiment of the system according to the invention for applying thermoplastic adhesives to a substrate.

In a schematic and isometric view, FIG. 3 shows an alternative embodiment of the system 19 according to the invention for applying fluids 20 to a substrate 21 (likewise not shown in FIG. 3). The example embodiment of the system 19 according to the invention shown schematically in FIG. 3 differs from the system 19 shown schematically in FIG. 2 primarily in the structure of the distributor head 2 to which the nozzle arrangement 1 according to the invention is connected.

Example embodiments of the nozzle arrangement 1 according to the invention or the spray nozzles 3 of the nozzle arrangement 1 according to the invention are described in more detail in the following with reference to the illustrations in FIG. 4 to FIG. 11.

In summary, common to all of the embodiments is that the nozzle arrangement 1 is used to apply fluids 20, in particular thermoplastic adhesives, to a substrate 21, where the nozzle arrangement 1 comprises a connecting body 9 which can be preferably interchangeably connected to a mounting region of a distributor 2 and a spray nozzle 3 which can be preferably interchangeably connected to the connecting body 9.

Figure 4:
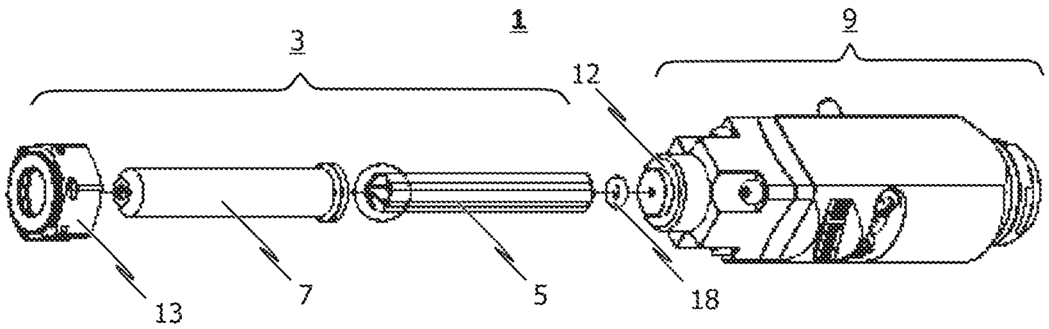
FIG. 4 schematically and in an isometric exploded view, a first example embodiment of a spray nozzle of the nozzle arrangement according to the invention.
Figure 7:
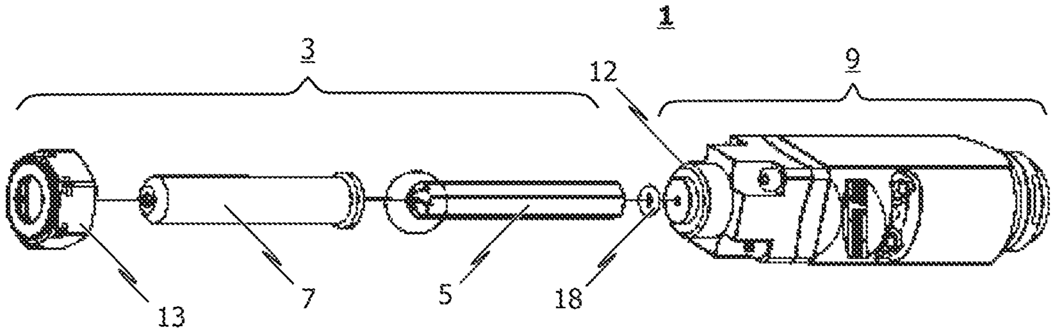
FIG. 7 schematically and in an isometric exploded view, a further example embodiment of the nozzle arrangement according to the invention.
Figure 11:
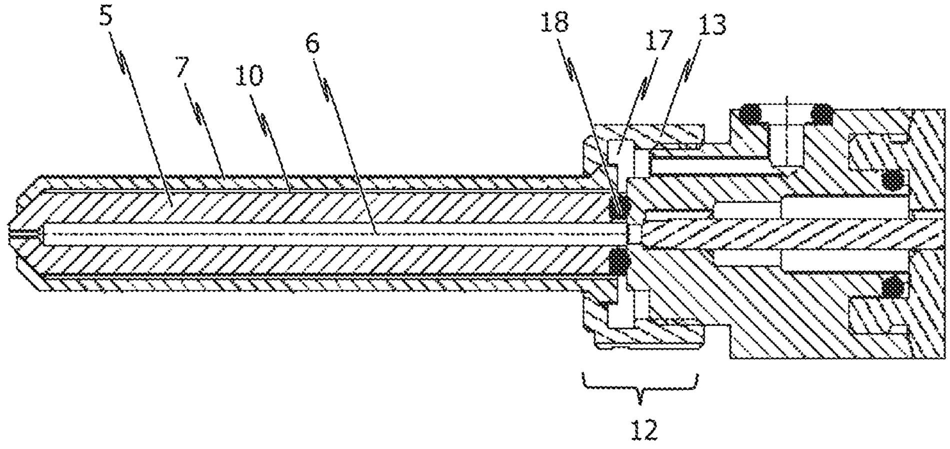
FIG. 11 schematically and in a longitudinal sectional view, the further example embodiment of the nozzle arrangement according to the invention according to FIG. 10.

As is in particular evident from the exploded views in FIG. 4 and FIG. 7 and from the sectional view in FIG. 11, the spray nozzle 3 according to the invention has a substantially two-part structure and consists of an in particular rod-shaped nozzle body 5 which extends in the longitudinal direction 4 of the spray nozzle 3 and a nozzle housing 7. The nozzle housing 7 comprises a sleeve-shaped base body.

A first fluid channel 6 for the fluid 20 to be applied to the substrate 21 is formed in the rod-shaped nozzle body 5. In this context, reference is made to the detail view, for example in FIG. 6 or FIG. 9, or to the sectional view in FIG. 11. The first fluid channel 6 extends in particular coaxially to the longitudinal axis of the (rod-shaped) nozzle body 5.

A plurality of second fluid channels 10 is formed between the outer surface of the rod-shaped nozzle body 5 and the inner surface of the in particular partially sleeve-shaped nozzle housing 7, and serves to supply shaping air to the end-side nozzle outlet region 11 of the spray nozzle 3. The shaping air delivered with the aid of the second fluid channels 10 in particular serves to create a spiral-shaped deflection of the fluid 20 dispensed or to be dispensed from the nozzle outlet opening at the nozzle outlet opening of the nozzle body 5.

More specifically, and as is evident in particular from the sectional view in FIG. 11, for example, the nozzle housing 7 of the spray nozzle 3 is configured at least partly as a sleeve-shaped body which at least in certain areas surrounds the (rod-shaped) nozzle body 5. It is in particular provided that the nozzle housing 7 can be fastened, preferably together with the nozzle body 5, to the connecting region 12 of the connecting body 9, in particular in a detachable and/or interchangeable manner, namely with the aid of a squeeze screw connection on the connecting region 12 of the connecting body 9 created by means of a union nut 13.

On the other hand, at least in the region in which it is held in the nozzle housing 7, the (in particular rod-shaped) nozzle body 5 is configured at least partly as a substantially cylindrical nozzle body 5, where groove regions 14 extending in the longitudinal direction 4 of the spray nozzle 3, or regions 15 extending in the longitudinal direction 4 of the spray nozzle 3 and recessed with respect to the outer surface of the cylindrical nozzle body 5, are formed in the substantially cylindrical nozzle body 5. Together with the inner surface of the nozzle housing 7, these regions (groove regions 14 or recessed regions 15) at least partly delimit the individual second fluid channels 10 of the spray nozzle 3.

Figure 8:
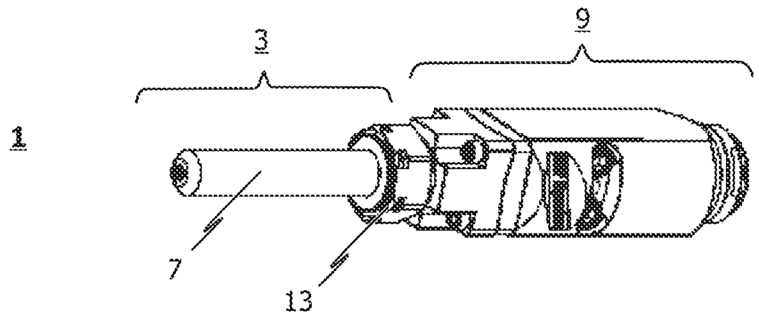
FIG. 8 schematically and in an isometric view, the further example embodiment of the nozzle arrangement according to the invention according to FIG. 7 in the assembled state.
Figure 9:
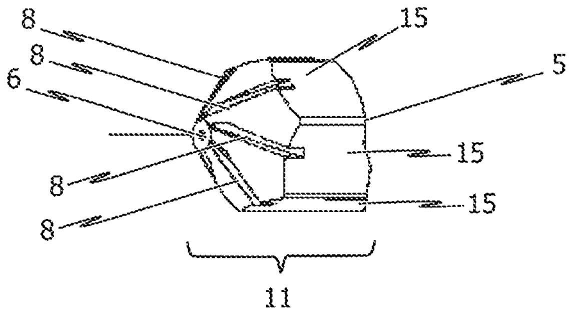
FIG. 9 schematically and in an isometric detail view, the nozzle body of the nozzle arrangement according to FIG. 7 at the end-side nozzle outlet region.
Figure 10:
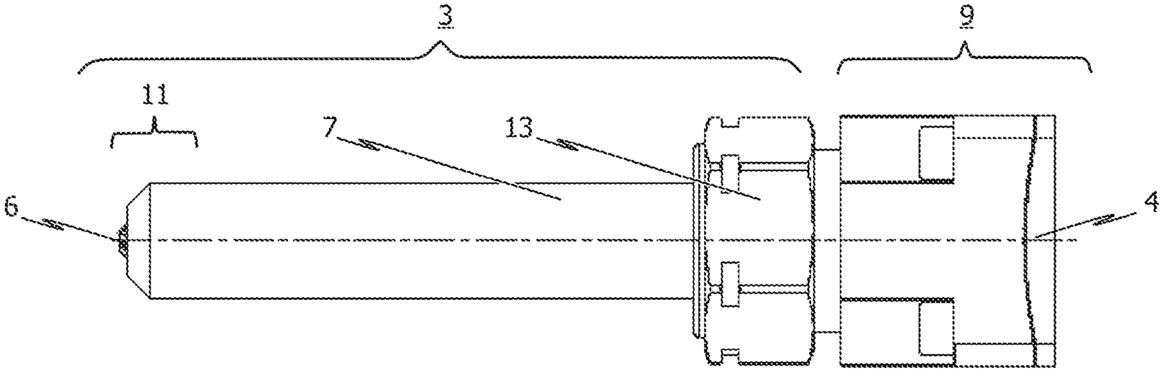
FIG. 10 schematically and in a side view, a further example embodiment of the nozzle arrangement according to the invention.

In the example embodiment of the nozzle arrangement 1 according to the invention shown in FIG. 7 to FIG. 9, it is provided that the rod-shaped nozzle body 5 has a polygonal cross-sectional profile at least in certain areas in order to form the corresponding second fluid channels 10 over the surface regions 15 of the polygonal cross-sectional profile (and the inner surface of the nozzle housing 7).

More specifically, in the embodiment according to FIG. 7 to FIG. 9 it is provided that the in particular rod-shaped nozzle body 5 has a hexagonal cross-sectional profile, at least in certain areas, in order to form a total of six second fluid channels 10 together with the nozzle housing 7.

According to preferred implementations, it is provided in this context that the diameter of the rod-shaped nozzle body 5 is preferably in a range from 6 mm to 12 mm and particularly preferably in a range from 6 mm to 10 mm.

In the case of the hexagonal cross-sectional profile shape of the rod-shaped nozzle body 5, which can be seen in particular in FIG. 9, the diameter of the rod-shaped nozzle body 5 is in particular 6 mm to 10 mm with a key face dimension of the hexagon between 5 mm and 9 mm.

Figure 5:
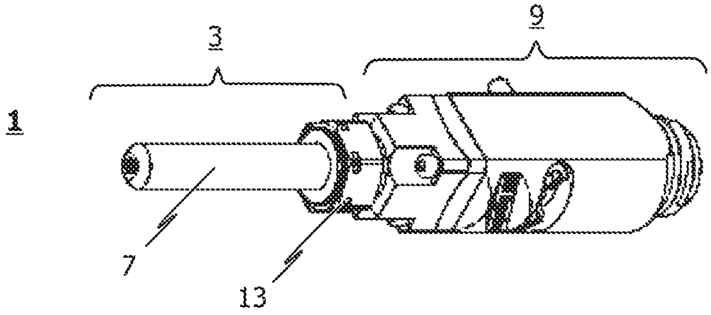
FIG. 5 schematically and in an isometric view, the example embodiment of the spray nozzle of the nozzle arrangement according to the invention according to FIG. 4 in the assembled state.
Figure 6:
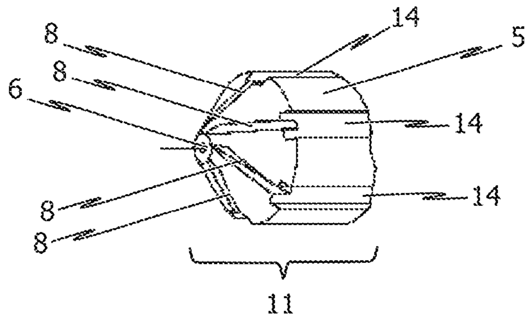
FIG. 6 schematically and in an isometric detail view, the nozzle body of the nozzle arrangement according to FIG. 4 at the end-side nozzle outlet region.

In contrast to the embodiment described above with reference to the illustrations in FIG. 7 to FIG. 9, the rod-shaped nozzle body 5 of the spray nozzle 3 in the example embodiment of the nozzle arrangement 1 according to the invention shown in FIG. 4 to FIG. 6 is provided, at least in certain areas, with a substantially circular-cylindrical cross-sectional profile, where groove regions 14 extending parallel to the longitudinal axis of the nozzle body 5 are formed in the outer surface of the circular-cylindrical nozzle body 5 to form the second fluid channels 10.

Independent of the question of how the second fluid channels 10 are ultimately formed, the second fluid channels 10 should be configured evenly spaced and in particular equidistant with respect to one another over the outer surface of the nozzle body 5, in order to be able to create the best possible spiral-shaped deflection of the fluid dispensed from the nozzle outlet opening of the nozzle body 5 at the nozzle outlet region 11.

Common to all of the example embodiments of the nozzle arrangement 1 according to the invention shown in the drawings is also that, at the end-side nozzle outlet region 11 of the spray nozzle 3, the nozzle body 5 has a conical shape which tapers in the direction of the nozzle outlet opening of the nozzle body 5 with a cone angle of preferably 30 degrees to 120 degrees and in particular with a cone angle of preferably 50 degrees to 100 degrees. In this context, reference is made to the detail view, for example in FIG. 6 or FIG. 9, or to the sectional view in FIG. 11.

In the nozzle arrangements 1 shown in the drawings, it is similarly provided that at least the inner surface of the nozzle housing 7 on the end-side nozzle outlet region 11 of the spray nozzle 3 has a conical shape which tapers in the direction of the nozzle outlet opening of the nozzle body 5 and in particular matches a conical shape of the nozzle body 5, namely such that, at least on the nozzle outlet region 11 of the spray nozzle 3, the second fluid channels 10 are aligned decentered in the direction of the nozzle outlet opening of the nozzle body 5 and in particular with respect to the nozzle outlet opening of the nozzle body 5. In this context, reference is made in particular to the detail view in FIG. 9.

It can also be seen from the detail view in FIG. 6 or FIG. 9 that, according to embodiments of the nozzle arrangement 1 according to the invention, groove and/or recess regions 8 are formed in the nozzle body 5 on the end-side nozzle outlet region 11 of the spray nozzle 3, each of which is fluidically connected to one of the second fluid channels 10.

In the sectional view in FIG. 11 it can be seen that, when the spray nozzle 3 is mounted on the connecting region 12 of the connecting body 9, a preferably ring-shaped region 17 is formed in a region between the connecting body 9 and the spray nozzle 3 and, on the one hand, is fluidically connected to a source for shaping air, in particular with a compressed air source (not shown in FIG. 10), and, on the other hand, is fluidically connected to the second fluid channels 10 of the spray nozzle 3.

The sectional view according to FIG. 11 also shows that a seal 18, in particular in the form of a sealing ring, is associated with the nozzle body 5 to separate the in particular ring-shaped region 17 for shaping air and a region, which is preferably arranged axially with respect to the longitudinal axis of the nozzle body 5 and via which the fluid to be applied to the substrate 21 is fed into the first fluid channel 6 of the spray nozzle 3.

Figure 12:
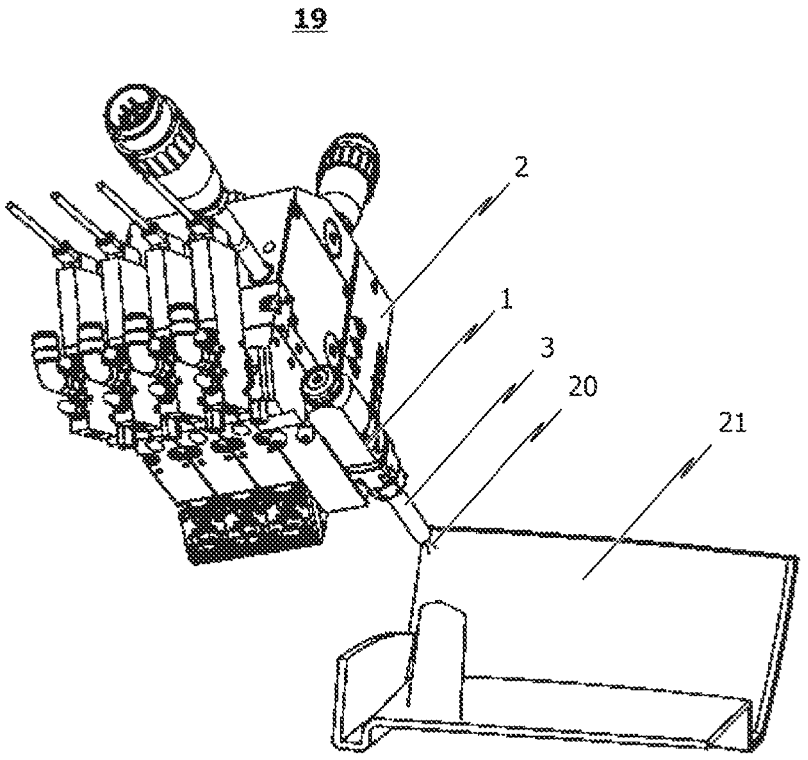
FIG. 12 schematically and in an isometric view, the example embodiment of the system according to the invention according to FIG. 2 when applying a thermoplastic adhesive to a substrate.

The invention further relates to the use of the nozzle arrangement 1 according to the invention for applying a fluid, in particular thermoplastic adhesive, to an edge fold region of a component, as shown schematically and in an isometric view in FIG. 12.

With the aid of the second fluid channels 10, shaping air (compressed air) is directed in the direction of the thermoplastic adhesive jet dispensed from the end-side nozzle outlet region 11 of the spray nozzle 3 to suitably deflect the adhesive jet 20. In this context, it is in particular provided that the dispensed thermoplastic adhesive jet is deflected in a spiral shape.

The invention is not limited to the example embodiments shown in the drawings, but results when all of the features disclosed herein are considered together.

What is claimed is:

1. A nozzle arrangement for applying a fluid to a substrate, the nozzle arrangement comprising:

- a connection body configured to be connectable to a mounting region of a distributor; and
- a spray nozzle configured to be connectable to the connection body,
- wherein the spray nozzle has a rod-shaped nozzle body extending in a longitudinal direction of the spray nozzle and that has at least one first fluid channel for the fluid to be applied to the substrate through a nozzle outlet opening of the nozzle body, the spray nozzle also having a nozzle housing configured to receive the nozzle body,
- wherein second fluid channels for shaping air are formed between a lateral surface of the nozzle body and an inner surface of the nozzle housing, the second fluid channels extending in the longitudinal direction of the spray nozzle,
- wherein the nozzle body has a conical shape at an end-side nozzle outlet region that narrows in a direction of the nozzle outlet opening,
- wherein the spray nozzle has grooves formed on the end-side nozzle outlet region, wherein each of the are grooves is fluidically connected to a different respective one of the second fluid channels and extends from an end of the respective second fluid channel towards the nozzle outlet opening so that the grooves shape and dispense the air received from the second fluid channels at the end-side nozzle outlet region of the spray nozzle to provide a spiral-shaped deflection of the fluid that is dispensed from the nozzle outlet opening of the nozzle body.

2. The nozzle arrangement of claim 1, wherein the nozzle housing is a sleeve-shaped body at least partially surrounding the nozzle body, wherein the nozzle housing is configured to be fastened to a connection region of the connection body.

3. The nozzle arrangement of claim 1, wherein the nozzle body has a polygonal cross-sectional profile in a first region with a first diameter between six millimeters and twelve millimeters, and the nozzle body has a hexagonal cross-sectional profile in a second region with a second diameter between six millimeters and ten millimeters.

4. The nozzle arrangement of claim 1, wherein the nozzle body has a substantially circular-cylindrical cross-sectional profile in a first region with groove regions forming at least portions of the second fluid channels, the groove regions extending parallel to a longitudinal axis of the nozzle body.

5. The nozzle arrangement of claim 1, wherein the second fluid channels are evenly spaced apart around the lateral surface of the nozzle body with respect to one another.

6. The nozzle arrangement of claim 1, wherein the nozzle body has a substantially cylindrical nozzle body in a region where the nozzle body is received by the nozzle housing, and the second fluid channels include at least one of i) groove regions extending in the longitudinal direction of the spray nozzle or ii) recessed regions extending in the longitudinal direction of the spray nozzle, the groove regions or recessed regions recessed with respect to the lateral surface of the nozzle body which delimit the second fluid channels with the inner surface of the nozzle housing.

7. The nozzle arrangement of claim 1, wherein the second fluid channels include at least three second fluid channels that extend parallel to a longitudinal axis of the nozzle body and are evenly spaced apart around the lateral surface of the nozzle body with respect to one another.

8. The nozzle arrangement of claim 1, wherein the inner surface of the nozzle housing has a conical shape which is matched to the conical shape of the nozzle body.

9. The nozzle arrangement of claim 1, wherein the conical shape at the end-side nozzle outlet region has a cone angle of between thirty degrees to one hundred twenty degrees.

10. The nozzle arrangement of claim 1, wherein the nozzle body has a length between twenty millimeters and one hundred millimeters along the longitudinal direction.

11. The nozzle arrangement of claim 1, wherein an annular region is formed between the connection body and the spray nozzle while the spray nozzle is mounted on a connection region of the connection body, the annular region fluidically connected at one side to a source for shaping air and at another side is fluidically connected to the second fluid channels of the spray nozzle.

12. The nozzle arrangement of claim 11, wherein the nozzle body is coupled with a seal that separates the annular region for shaping air and a region that is axially arranged with respect to the longitudinal direction of the nozzle body and via which the fluid is fed into the at least one first fluid channel of the spray nozzle.

13. A method comprising:

applying a fluid to an edge fold region of a substrate using a nozzle arrangement having a connecting body and a spray nozzle,

- wherein the connecting body of the nozzle arrangement is configured to be removably connectable to a mounting region of a distributor;
- wherein the spray nozzle is configured to be removably connectable to the connecting body, the spray nozzle comprising:
  - a rod-shaped nozzle body extending in a longitudinal direction of the spray nozzle and comprising at least one first fluid channel for the fluid from the distributor to be applied to the substrate through a nozzle outlet opening of the nozzle body, the nozzle body having a conical shape at an end-side nozzle outlet region that narrows in a direction of the nozzle outlet opening;
  - a nozzle housing configured to receive the nozzle body;
  - second fluid channels for shaping air formed between a lateral surface of the nozzle body and an inner surface of the nozzle housing, the second fluid channels extending in the longitudinal direction of the spray nozzle; and
  - grooves formed on the end-side nozzle outlet region, wherein each of the grooves is fluidically connected to a different respective one of the second fluid channels and extends from an end of the respective second fluid channel towards the nozzle outlet opening; and dispensing the fluid and the air at the end-side nozzle outlet region at the nozzle outlet opening so that the grooves dispense the air received from the second fluid channels to provide a spiral-shaped deflection of the fluid that is dispensed from the nozzle outlet opening.

14. A system for applying fluid to a substrate, the system comprising:

a distributor head configured to be connected to a robot arm and which is movable relative to the substrate along a movement direction;

a connecting body configured to be removably connectable to a mounting region of the distributor head; and a spray nozzle configured to be removably connectable to the connecting body, the spray nozzle comprising:

a rod-shaped nozzle body extending in a longitudinal direction of the spray nozzle and comprising at least one first fluid channel for the fluid to be applied to the substrate through a nozzle outlet opening of the nozzle body, the nozzle body having a conical shape at an end-side nozzle outlet region that narrows in a direction of the nozzle outlet opening;

a nozzle housing configured to receive the nozzle body;

second fluid channels for shaping air formed between a lateral surface of the nozzle body and an inner surface of the nozzle housing, the second fluid channels extending in the longitudinal direction of the spray nozzle; and grooves formed on the end-side nozzle outlet region, wherein each of the grooves is fluidically connected to a different respective one of the second fluid channels and extends from an end of the respective second fluid channel towards the nozzle outlet opening.

15. The system of claim 14, wherein the nozzle housing and the nozzle body are configured to be detachable to a connecting region of the connecting body.

16. The system of claim 14, wherein the nozzle housing is configured to be fastened to a connecting region of the connecting body by a compressive screw connection that includes a union nut.

17. The system of claim 14, wherein a portion of the nozzle body has a hexagonal cross-sectional profile having a key face dimension between five millimeters and nine millimeters.

18. The system of claim 14, wherein the second fluid channels are equidistant from each other.

19. The system of claim 14, wherein the second fluid channels are decentralized with respect to the nozzle outlet opening of the nozzle body.

* * * * *